US011859408B1

(12) United States Patent
Eid et al.

(10) Patent No.: US 11,859,408 B1
(45) Date of Patent: Jan. 2, 2024

(54) DOOR LOCK OPENING DEVICE

(71) Applicant: Kindoo LLP, Kelowna (CA)

(72) Inventors: Gilbert Eid, Beit Meri (LB); Michael Chaftari, Dubai (AE)

(73) Assignee: Kindoo LLP, Kelowna (CA)

( * ) Notice: Subject to any disclaimer, the term of this patent is extended or adjusted under 35 U.S.C. 154(b) by 0 days.

(21) Appl. No.: 18/142,520

(22) Filed: May 2, 2023

(51) Int. Cl.
*E05B 47/00* (2006.01)
*E05B 15/04* (2006.01)
*E05B 13/10* (2006.01)

(52) U.S. Cl.
CPC ........ *E05B 47/0002* (2013.01); *E05B 13/101* (2013.01); *E05B 15/04* (2013.01); *E05B 2015/0413* (2013.01); *E05B 2047/002* (2013.01); *E05B 2047/0016* (2013.01)

(58) Field of Classification Search
CPC ... Y10T 292/82; Y10T 292/85; Y10T 292/93; E05B 1/00; E05B 2047/002; E05B 13/10; E05B 13/101; E05B 17/044; E05B 81/46; E05B 85/06
USPC ............................................ 70/221–224, 277
See application file for complete search history.

(56) References Cited

U.S. PATENT DOCUMENTS 1,005,496 A * 10/1911 Armbruster ......... B60R 25/0222 70/189
1,565,754 A * 12/1925 Orth .......................... F02N 1/02 292/358
1,634,845 A * 7/1927 Netchert ............. E05B 15/0033 292/358
2,000,279 A * 5/1935 Fitz Gerald ........... E05B 13/108 70/224
2,450,840 A * 10/1948 Milligan ............... E05B 55/005 70/216
2,497,328 A * 2/1950 Smith ................... E05B 55/005 292/169.18
2,497,329 A * 2/1950 Smith ..................... E05C 1/163 292/169.14
3,894,417 A * 7/1975 Taniyama ........... E05B 47/0661 70/156
3,922,896 A * 12/1975 Kagoura ............... E05B 55/005 70/218
3,939,679 A * 2/1976 Barker .................. F41A 17/063 341/181
4,073,527 A * 2/1978 Schlage ................ E05B 47/068 292/144
4,956,984 A * 9/1990 Chi-Cheng ........... E05B 47/068 70/277

(Continued)

*Primary Examiner* — Carlos Lugo
(74) *Attorney, Agent, or Firm* — Georgiy L. Khayet

(57) ABSTRACT

An opening device for a door lock is provided. The opening device includes a driver rigidly connected to an inside handle; an inside shaft designed to rotate an internal latching mechanism of the door lock, the inside shaft having a follower and a through cavity; a first gear engaged rotationally to the driver; an outside shaft designed to be rotated by an outside handle, the outside shaft including a cylindrical part disposed inside the through cavity of the inside shaft, a polyhedral part engaged with the outside handle, and a gear seat located at end of the cylindrical part and outside of the inside shaft; a second gear slidable along the gear seat; an engagement mechanism causing the first gear and the second gear to be engaged, thereby causing the driver to engage the follower, which causes the inside shaft to rotate in response to rotation of the outside shaft.

21 Claims, 7 Drawing Sheets

(56) References Cited

U.S. PATENT DOCUMENTS

| | | | | |
|---|---|---|---|---|
| 5,010,752 | A * | 4/1991 | Lin | E05B 47/068 70/277 |
| 5,974,912 | A * | 11/1999 | Cheng | E05B 13/101 70/279.1 |
| 6,216,500 | B1 * | 4/2001 | Kang | E05B 13/10 292/357 |
| 6,334,348 | B1 * | 1/2002 | Ming-Chih | E05B 47/068 70/277 |
| 6,807,833 | B1 * | 10/2004 | Huang | E05B 13/101 70/217 |
| 6,807,834 | B2 * | 10/2004 | Tsai | E05B 47/068 70/279.1 |
| 7,100,407 | B2 * | 9/2006 | Chen | E05B 55/005 70/472 |
| 7,523,971 | B2 * | 4/2009 | Ebert | E05B 3/04 292/358 |
| 7,918,114 | B2 * | 4/2011 | Walsh, III | E05B 47/0661 70/277 |
| 8,006,525 | B2 * | 8/2011 | Huang | E05B 47/068 70/279.1 |
| 8,479,544 | B2 * | 7/2013 | Liu | E05B 55/005 292/336.3 |
| 8,813,530 | B2 * | 8/2014 | Chiou | E05B 55/005 292/336.3 |

* cited by examiner

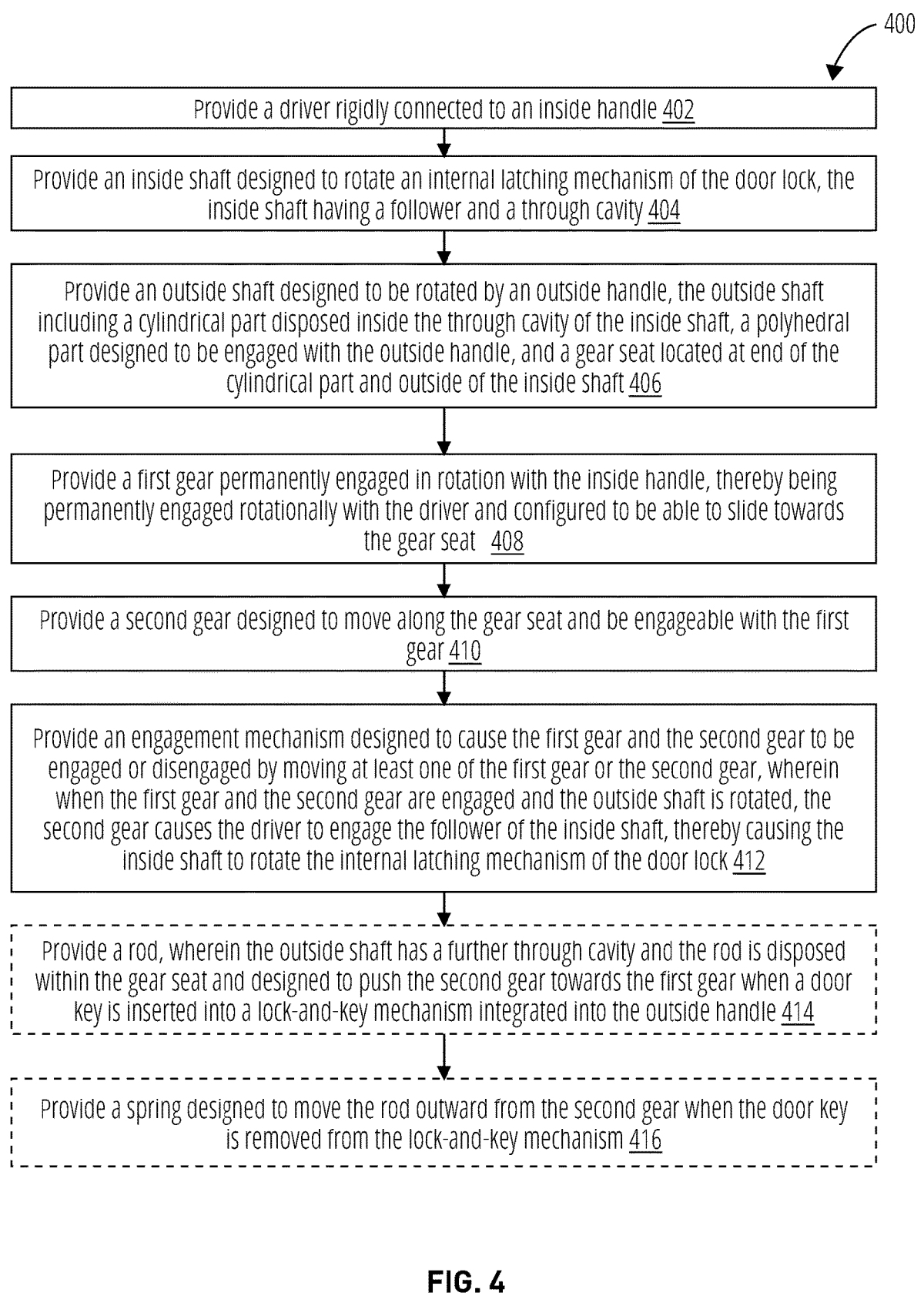

400

Provide a driver rigidly connected to an inside handle 402

Provide an inside shaft designed to rotate an internal latching mechanism of the door lock, the inside shaft having a follower and a through cavity 404

Provide an outside shaft designed to be rotated by an outside handle, the outside shaft including a cylindrical part disposed inside the through cavity of the inside shaft, a polyhedral part designed to be engaged with the outside handle, and a gear seat located at end of the cylindrical part and outside of the inside shaft 406

Provide a first gear permanently engaged in rotation with the inside handle, thereby being permanently engaged rotationally with the driver and configured to be able to slide towards the gear seat 408

Provide a second gear designed to move along the gear seat and be engageable with the first gear 410

Provide an engagement mechanism designed to cause the first gear and the second gear to be engaged or disengaged by moving at least one of the first gear or the second gear, wherein when the first gear and the second gear are engaged and the outside shaft is rotated, the second gear causes the driver to engage the follower of the inside shaft, thereby causing the inside shaft to rotate the internal latching mechanism of the door lock 412

Provide a rod, wherein the outside shaft has a further through cavity and the rod is disposed within the gear seat and designed to push the second gear towards the first gear when a door key is inserted into a lock-and-key mechanism integrated into the outside handle 414

Provide a spring designed to move the rod outward from the second gear when the door key is removed from the lock-and-key mechanism 416

FIG. 4

DOOR LOCK OPENING DEVICE

TECHNICAL FIELD

This disclosure generally relates to the field of door locks and, more particularly, to opening devices for door locks.

BACKGROUND

Doors are typically mounted at the entrance of a building or a room and equipped with door locks that prevent unauthorized entry into the building or the room. Many door locks are opened by rotating, via a handle, a shaft that drives internal latching mechanisms to move latches out of a structure located against the door lock. Generally, the doors are equipped with an inside handle and outside handle. The inside handle is located inside the building or the room that the door protects access to, which can be referred to as the unsecured side of the door. The outside handle is located outside the building or the room, which can be referred to as the secure side of the door. Typically, the door can be opened by rotation of the inside handle. Additionally, the outside handle can be locked by a lock-and-key mechanism or by an electronic locking mechanism, so it cannot open the door lock because rotation of the outside handle is either blocked or the outside handle rotates freely without engaging the internal shaft. There are known security mechanisms that allow disengaging and engaging the outside handle with an internal latching mechanism, so the door lock can be opened only when the outside handle is engaged with the internal latching mechanism. However, the existing locking and security mechanisms are located on the secure side of the door, i.e., outside the building or the room the door protects access to. These mechanisms are usually known to be attackable with magnetic devices defeating the internal protection systems. Accordingly, these mechanisms are vulnerable to attacks and attempts to break in from the secure side of the door, i.e., the outside of the door. Therefore, there is a need for a door lock control mechanism that can fit the majority of standard door locks with a secure unlocking mechanism located on the unsecured side of the door.

SUMMARY

This section is provided to introduce a selection of concepts in a simplified form that are further described below in the Detailed Description section. This summary is not intended to identify key features or essential features of the claimed subject matter, nor is it intended to be used as an aid in determining the scope of the claimed subject matter.

According to an example embodiment, an opening device for a door lock is provided. The opening device may include a driver rigidly connected to an inside handle. The opening device may include an inside shaft designed to rotate an internal latching mechanism of the door lock. The inside shaft may include a follower for causing the inside shaft to rotate and a through cavity. The opening device may include an outside shaft designed to be rotated by an outside handle. The outside shaft may include a cylindrical part disposed inside the through cavity of the inside shaft, a polyhedral part designed to be engaged with the outside handle, and a gear seat located at an end of the cylindrical part and outside of the inside shaft. The opening device may include a first gear permanently engaged in rotation with the inside handle, thus being permanently rotationally engaged with the driver and configured to be able to slide toward the gear seat. The opening device may include a second gear designed to move along the gear seat and be engageable with the first gear. The first gear may slide towards the second gear while remaining rotationally engaged with the inside handle. The opening device may include an engagement mechanism designed to cause the first gear and the second gear to be engaged or disengaged. The engagement mechanism may engage the first gear and the second gear by one of the following: moving the first gear toward the second gear while the second gear remains unmoved, moving the second gear along the gear seat toward the first gear while the first gear remains unmoved, or moving both the first gear and the second gear toward each other. When the second gear engages the first gear and the outside shaft is rotated, the second gear causes the driver to engage the follower of the inside shaft, thereby causing the inside shaft to rotate the internal latching mechanism of the door lock.

The door lock can be integrated into a door. The engagement mechanism, the second gear, the driver, and the follower are located inside a space the door protects (at the unsecured side of the door) or inside the door. When the second gear is disengaged from the first gear, the driver stops to respond to rotation of the outside shaft. The driver can be capable of engaging the follower in response to a rotation of the inside handle independently of whether the second gear is engaged with the first gear.

The opening device may further include a disk and a tube. The disk can be rigidly connected to the driver. The tube can be rigidly connected to the inside handle.

The engagement mechanism may include an electrical magnet causing the second gear to move toward the first gear. The engagement mechanism may include an electromechanical motor designed to move the second gear toward the first gear. The engagement mechanism may include a spring causing the first gear and the second gear to move away from each other.

The engagement mechanism may include an electrical magnet causing the first gear to move toward the second gear. The engagement mechanism may include an electromechanical motor designed to move the first gear toward the second gear. The engagement mechanism may include a spring causing the first gear and the second gear to move away from each other.

The outside shaft may have a further through cavity. The opening device may further include a rod disposed within the further through cavity. The rod can be designed to push the second gear toward the first gear when a door key is inserted into a lock-and-key mechanism integrated into the outside handle. The opening device may further include a spring designed to move the rod outward from the second gear when the door key is removed from the lock-and-key mechanism.

The opening device may include a push button mounted on a surface of the inside handle. Pressing the push button may cause the first gear to move toward the second gear and engage with the second gear, thereby allowing the inside shaft to be rotated by the outside handle to unlock the door lock until the push button is released. Releasing the push button may cause the first gear to move away from the second gear and disengage the second gear, thereby disallowing the inside shaft to be rotated by the outside handle and preventing unlocking the door lock via the outside handle.

The opening device may include a dial mounted on a surface of the inside handle, a blade located inside an internal cavity of the inside handle, and a rod connecting the dial and the blade. The first gear may include a sloped back side engageable with the blade. When the blade is rotated by the dial via the rod in a first direction, the rotation of the blade may cause, via the sloped back side, the first gear to move toward the second gear and engage the second gear, thereby allowing the inside shaft to be rotated by the outside handle and to unlock the door lock. The first gear and the second gear can be engaged until the blade is rotated by the dial via the rod in a second direction, the second direction being opposite to the first direction.

The opening device may include an electro-mechanical motor or electrical magnet inside the tube of the inside handle that can cause the first gear to move toward the second gear and engage the second gear, thereby allowing the inside shaft to be rotated by the outside handle and to unlock the door lock. The first gear and the second gear can be engaged until the electro-mechanical motor or the electrical magnet pull back the first gear away from the second gear.

According to another embodiment of the present disclosure, a method for manufacturing an opening device for a door lock is provided. The method may include providing a driver rigidly connected to an inside handle. The opening device may include a first gear permanently engaged in rotation with the inside handle, thereby being permanently engaged rotationally with the driver and configured to be able to slide towards the gear seat. The method may include providing an inside shaft designed to rotate an internal latching mechanism of the door lock. The inside shaft may have a follower for causing the inside shaft to rotate and a through cavity. The method may include providing an outside shaft designed to be rotated by an outside handle. The outside shaft may include a cylindrical part disposed inside the through cavity of the inside shaft, a polyhedral part designed to be engaged with the outside handle, and a gear seat located at end of the cylindrical part and outside of the inside shaft. The method may include providing a second gear designed to move along the gear seat and be engageable with the first gear. The method may include providing an engagement mechanism designed to cause the first gear and the second gear to be engaged or disengaged. The engagement mechanism may engage the first gear and the second gear by one of the following: moving the first gear toward the second gear while the second gear remains unmoved, moving the second gear along the gear seat toward the first gear while the first gear remains unmoved, or moving both the first gear and the second gear toward each other. When the second gear and the first gear are engaged and the outside shaft is rotated, the second gear causes the driver to engage the follower of the inside shaft, thereby causing the inside shaft to rotate the internal latching mechanism of the door lock.

Additional objects, advantages, and novel features of the examples will be set forth in part in the description which follows, and in part will become apparent to those skilled in the art upon examination of the following description and the accompanying drawings or may be learned by production or operation of the examples. The objects and advantages of the concepts may be realized and attained by means of the methodologies, instrumentalities and combinations particularly pointed out in the appended claims.

BRIEF DESCRIPTION OF THE SEVERAL VIEWS OF THE DRAWINGS

Embodiments are illustrated by way of example and not limitation in the figures of the accompanying drawings, in which like references indicate similar elements and in which:

FIG. 4 illustrates method 400 for manufacturing an opening device for a door lock in accordance with one embodiment.

DETAILED DESCRIPTION

Figure 1A:
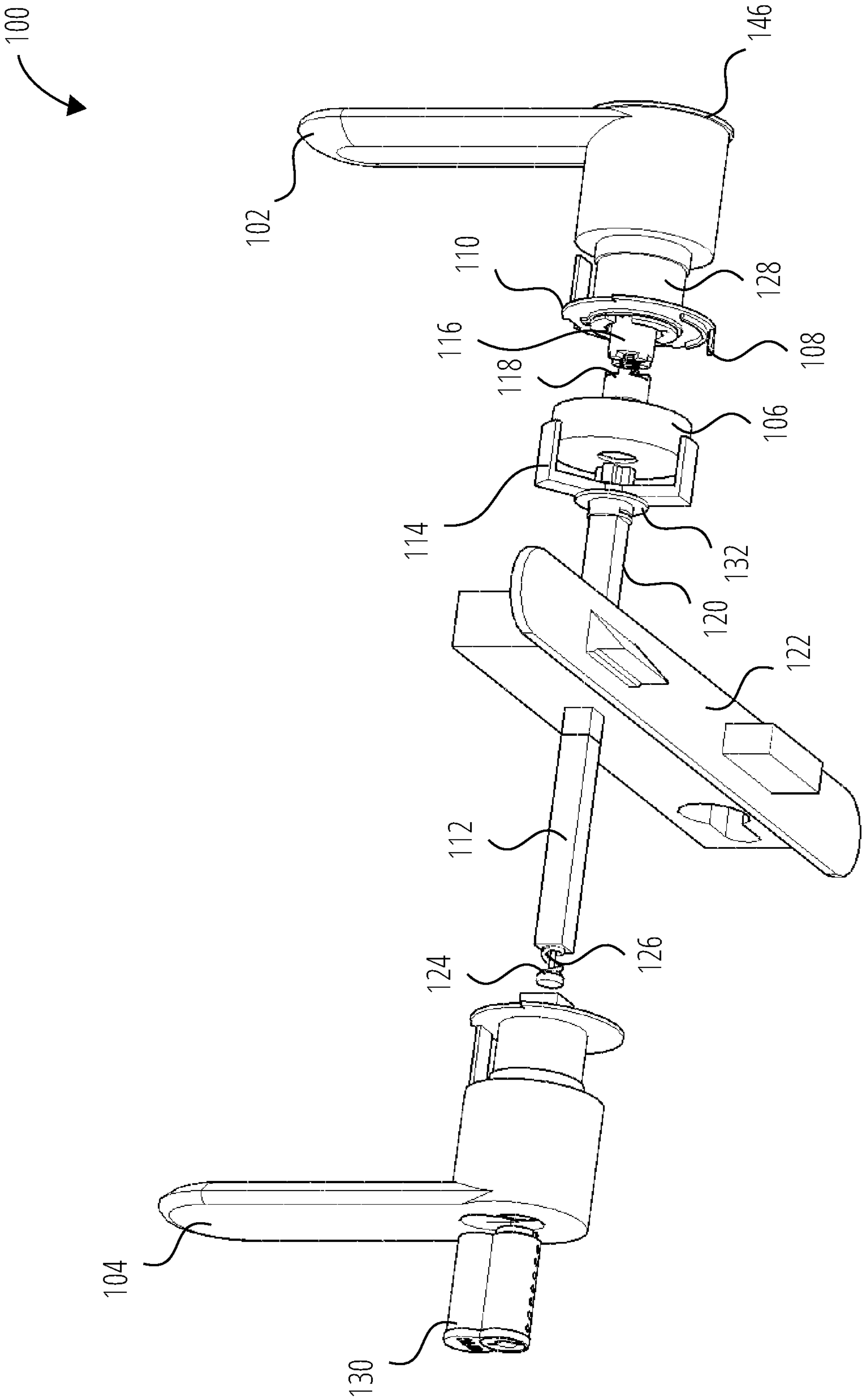
FIG. 1A is a view of an opening device in assembly, according to an example embodiment.

The following detailed description of embodiments includes references to the accompanying drawings, which form a part of the detailed description. Approaches described in this section are not prior art to the claims and are not admitted to be prior art by inclusion in this section. The drawings show illustrations in accordance with example embodiments. These example embodiments, which are also referred to herein as "examples," are described in enough detail to enable those skilled in the art to practice the present subject matter. The embodiments can be combined, other embodiments can be utilized, or structural, logical and operational changes can be made without departing from the scope of what is claimed. The following detailed description is, therefore, not to be taken in a limiting sense, and the scope is defined by the appended claims and their equivalents.

Embodiments of this disclosure generally relate to opening devices for door locks. Some embodiments of the present disclosure solve issues of existing opening mechanisms for door locks. Certain embodiments of the present disclosure may allow arranging mechanisms for opening the door lock by an outside handle inside a building or room protected by the door. Therefore, these embodiments of the present disclosure may facilitate protecting the mechanisms for opening the door locks from outside attacks and attempts to break in, thereby increasing security of the door locks and preventing unauthorized access to the buildings and the rooms.

According to an example embodiment, an opening device for a door lock may include a driver rigidly connected to an inside handle. The opening device may include an inside shaft designed to rotate an internal latching mechanism of the door lock. The opening device may include a first gear permanently engaged in rotation with the inside handle, thereby being permanently engaged rotationally with the driver. The inside shaft may have a follower and a through cavity. The opening device may include an outside shaft designed to be rotated by an outside handle. The outside shaft may include a cylindrical part disposed inside the through cavity of the inside shaft, a polyhedral part designed to be engaged with the outside handle, and a gear seat located at end of the cylindrical part and outside of the inside shaft. The opening device may further include a second gear designed to move along the gear seat and be engageable with the first gear. The first gear can slide along a direction toward the second gear. The inside handle may include an actuating mechanism to slide the first gear towards the second gear to engage with the second gear. The actuating mechanism may allow holding the first gear in engagement with the second gear. Additionally, the opening device may further include an engagement mechanism designed to cause the second gear to move along the gear seat to engage or disengage the first gear. When the second gear and the first gear are engaged and the outside shaft is rotated, the second gear causes the driver to engage the follower of the inside shaft, thereby causing the inside shaft to rotate the internal latching mechanism of the door lock.

Referring now to the drawings, FIG. 1A shows an opening device 100 in assembly, according to an example embodiment.

Figure 1B:
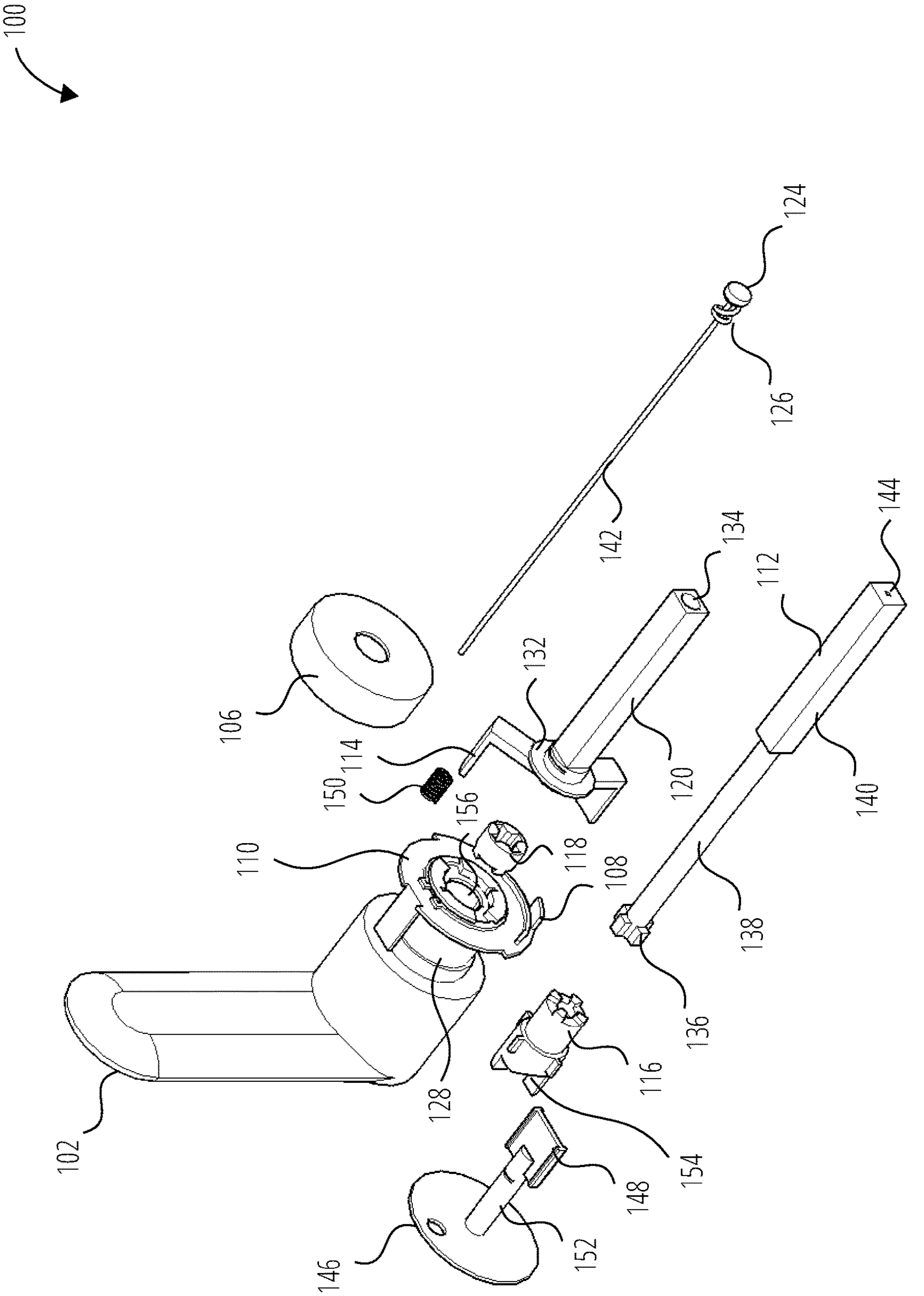
FIG. 1B is an exploded view of parts of an opening device, according to an example embodiment.

FIG. 1B shows exploded view of the opening device 100, according to an example embodiment.

The opening device 100 may include an inside handle 102, an inside shaft 120, an outside shaft 112, a driver 108, a follower 114, a disk 110, a tube 128, a first gear 116, a second gear 118, an electrical magnet 106, a rod 142, a control dial 146, a rod 152, a blade 148, a spring 150, and a spring 126.

Driver 108 can be rigidly attached to the external circumference of disk 110. The first gear 116 can be located at the center of disk 110. The first gear 116 can be permanently engaged in rotation with the disk 110. First gear 116 can slide along the direction of tube 128. Tube 128 can be rigidly attached to disk 110. Tube 128 can be rigidly attached to the inside handle 102. Thus, when inside handle 102 is rotating, driver 108 rotates in the direction of rotation of the inside handle 102.

The control dial 146 can be rotated on the surface of the inside handle to cause the first gear 116 to slide along an internal cavity 156 of the tube 128. To allow sliding of the first gear 116 in response to the rotation of control dial 146, the first gear 116 may include a sloped back side 154 engaged with blade 148. Blade 148 can be connected with control dial 146 via rod 152. Both rod 152 and blade 148 can be located inside the internal cavity 156 of the tube 128. When control dial 146 is turned in a first direction, first gear 116 moves towards second gear 118. First gear 116 and second gear 118 remain engaged until control dial 146 is turned in a second direction opposite to the first direction. When control dial 146 is turned in the second direction, first gear 116 moves outward the second gear 118, thereby disengaging second gear 118.

In another embodiment, opening device 100 may include a push button located on the surface of inside handle 102. The push button can be engaged with first gear 116. When push button is pressed, first gear 116 moves toward second gear 118 and engages with second gear 118. First gear 116 and second gear 118 remain engaged until the push button is released. When the push button is released, first gear 116 moves away from the second gear 118, thereby disengaging second gear 118.

The follower 114 can be rigidly connected to inside shaft 120. The inside shaft 120 can be engaged with the internal latching mechanism of a door lock 122. When driver 108 engages follower 114 and keeps rotating, it causes the inside shaft to rotate in the same direction as inside handle 102. While rotating, inside shaft 120 can drive the internal latching mechanism to unlock the door lock 122.

In another embodiment, the opening device 100 may include an electro-mechanical motor (not shown) or an electrical magnet (not shown) inside the tube 128 of the inside handle 102 that can cause the first gear 116 to move toward the second gear 118 and engage the second gear 118. The first gear 116 and the second gear 118 can be engaged until the electro-mechanical motor or the electrical magnet pull back the first gear 116 away from the second gear 118. The opening device 100 may include a spring 150 designed to move second gear 118 away from first gear 116 when the electronic circuit stops providing the electrical current to the electrical magnet. The spring 150 can be located between first gear 116 and second gear 118.

The outside shaft 112 can be engaged and rotated with outside handle 104. Lock-and-key mechanism 130 can be integrated into the outside handle 104. Lock-and-key mechanism 130 can be designed to receive a door key (not shown) and can allow unlocking the outside handle 104 when the door key is rotated by a pre-determined angle.

The inside shaft 120 may have a through cavity 134. The outside shaft 112 may include a cylindrical part 138, a polyhedral part 140, and gear seat 136. When the opening device 100 is in assembly, the cylindrical part 138 is disposed within through cavity 134 and the gear seat 136 is disposed outside the inside shaft 120. When in the assembly, outside shaft 112 and inside shaft 120 can be allowed to rotate independently of each other around a common axis of rotation.

Outside shaft 112 may have through cavity 144. When the opening device 100 is in assembly, rod 142 is disposed within the through cavity 144 while a rod thickening 124 and a spring 126 are located outside. Rod thickening 124 can be located at the end of rod 142. Spring 126 can be wound around rod 142 at rod thickening 124.

Second gear 118 can be designed to move along gear seat 136 of the outside shaft 112. Second gear 118 can be engaged with first gear 116 of inside shaft 120 while still being engaged with gear seat 136. The shape and number of gear teeth of first gear 116, gear seat 136, and second gear 118 can be different from shown in FIG. 1A and FIG. 1B. When second gear 118 is engaged with first gear 116, rotation of the gear seat 136 (caused by rotation of outside shaft 112) may cause rotation of first gear 116, and, in turn, rotation of disk 110 and driver 108. When driver 108 engages with follower 114, it causes rotation of the inside shaft 120, thereby opening the door lock 122. When second gear 118 is not engaged with first gear 116, rotation of outside shaft 112 will not result in rotation of first gear 116, disk 110, or driver 108.

To be engaged with first gear 116, second gear 118 can be moved toward first gear 116 by an engagement mechanism. In some example embodiments, the engagement mechanism may include an electrical magnet 106 located around second gear 118 and between follower 114 and disk 110. The engagement mechanism may further include an electronic circuit. The electronic circuit may include a receiver, a microprocessor, and a battery. The electronic circuit can provide an electrical current to the electrical magnet 106 in response to receiving a signal or a code. When electrical magnet 106 is provided with the electrical current, electrical magnet 106 generates a magnetic field forcing second gear 118 to move toward the first gear 116 and engage with it. The opening device 100 may include a spring 150 designed to move second gear 118 away from first gear 116 when the electronic circuit stops providing the electrical current to electrical magnet 106. The spring can be located between first gear 116 and second gear 118. In some example embodiments, the engagement mechanism may include an electro-mechanical motor to move second gear 118 either toward first gear 116 or away from first gear 116.

It should be noted that second gear 118, first gear 116, gear seat 136, the engagement mechanism (including electrical magnets or electro-mechanical motors), drivers 108, and follower 114 can be arranged on the unsecure side of a door, i.e., inside a building or a door protected by the door lock 122. This arrangement allows lowering vulnerability of opening devices 100 against attacks from outside the building or the room.

The second gear 118 can also be engaged with first gear 116 by door key (not shown) inserted into lock-and-key mechanism 130. When inserted, the door key may push rod thickening 124, thereby causing rod 142 to move along the through cavity 144 of outside shaft 112 and move the second gear 118 to be engaged with first gear 116.

In some embodiments, rod 142 can be rigidly connected to second gear 118. In these embodiments, when the door key is pulled out from lock-and-key mechanism 130, spring 126 may expand, allowing rod 142 to move second gear 118 away from first gear 116 to disengage second gear 118 and first gear 116. In these embodiments, the spring 126 may also expand after the engagement mechanism (including electrical magnets 106 or an electro-mechanical motor) stops pushing the second gear 118 toward first gear 116, thereby disengaging second gear 118 and first gear 116.

In some embodiments, rod 142 is not rigidly connected to the second gear 118. In these embodiments, when the door key is pulled out from lock-and-key mechanism 130, the spring 150 located between the first gear 116 and second gear 118 can move the second gear 118 and the first gear 116 away from each other.

Figure 2:
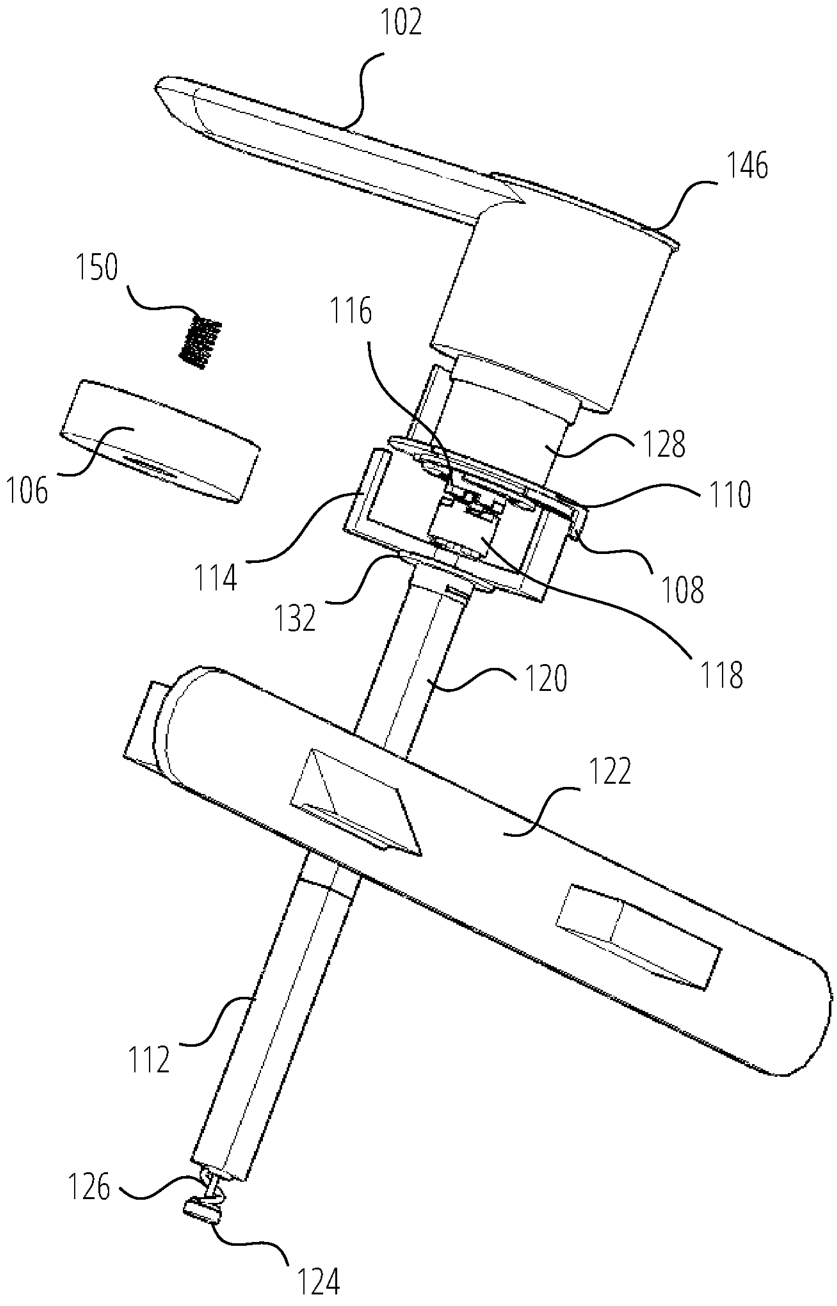
FIG. 2 is a view of an opening device in a mode disallowing opening a door lock from outside, according to an example embodiment.

FIG. 2 is a view of an opening device 100 in a mode disallowing opening a door lock from outside, according to an example embodiment. In FIG. 2, second gear 118 is not engaged with first gear 116 because, for example, the electrical magnet 106 is not provided with an electrical current to move the second gear 118 toward first gear 116. Accordingly, rotation of outside shaft 112 cannot cause rotation of the first gear 116, disk 110, driver 108, and inside shaft 120. Therefore, door lock 122 cannot be unlocked from outside using outside handle 104 (shown in FIG. 1A).

At the mode disallowing opening a door lock from outside, the door lock 122 can be unlocked by rotating inside handle 102. When the inside handle 102 rotates, it causes, via tube 128 and disk 110, rotation of driver 108. Driver 108 may engage with follower 114 to cause rotation of inside shaft 120. The rotation of inside shaft 120 may cause the internal latching mechanism of door lock 122 to unlock the door lock 122. In some embodiments, the opening device 100 may include a returning spring (not shown) disposed around follower 114. The returning spring may expand and rotate the inside shaft 120 back to an initial position.

Figure 3:
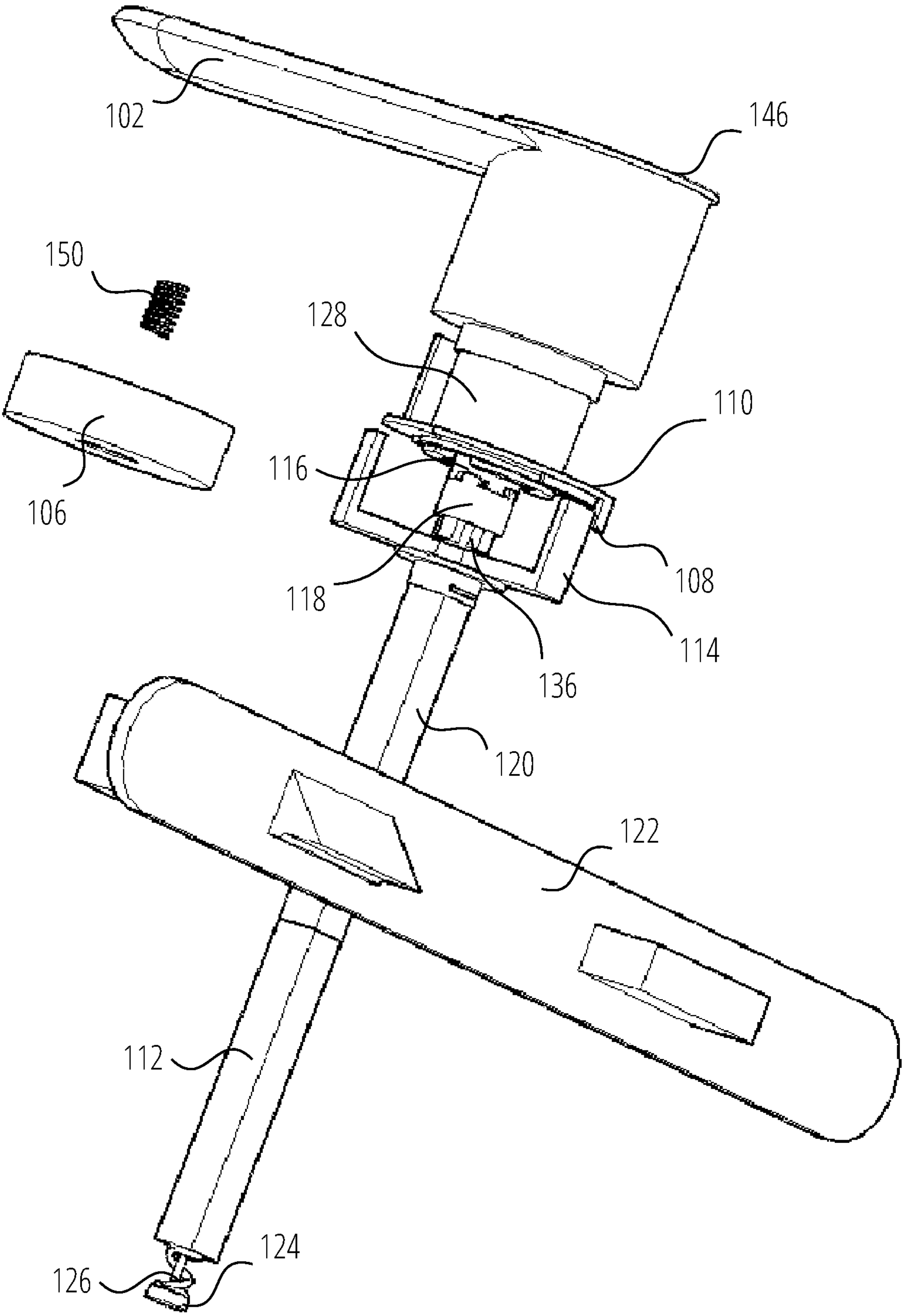
FIG. 3 is a view of an opening device in a mode allowing opening a door lock from outside, according to an example embodiment.

FIG. 3 is a view of an opening device 100 in a mode allowing opening a door lock from outside, according to an example embodiment. In FIG. 3, second gear 118 is engaged with first gear 116 by the electrical magnet 106. Accordingly, rotation of outside shaft 112 may cause rotation of the first gear 116, disk 110, and driver 108. As result, driver 108 may engage with follower 114 to cause rotation of inside shaft 120. The rotation of inside shaft 120 may cause the internal latching mechanism of door lock 122 to unlock the door lock 122. Therefore, door lock 122 can be unlocked from outside using outside handle 104 (shown in FIG. 1A).

Because inside shaft 120 can rotate independently on outside shaft 112, the mode allowing opening door lock 122 from outside does not prohibit opening the door lock 122 from inside. The mechanism of opening door lock 122 from inside is described in FIG. 2.

FIG. 4 illustrates a method 400 for manufacturing an opening device for a door lock, in accordance with one embodiment. In some embodiments, the operations of method 400 may be combined, performed in parallel, or performed in a different order. The method 400 may also include additional or fewer operations than those illustrated.

In block 402, method 400 may include providing a driver rigidly connected to an inside handle. In some embodiments, method 400 may include providing a disk and a tube. The disk can be rigidly connected to the driver. The disk can be rigidly connected to the tube. The tube can be rigidly connected to the inside handle.

In block 404, method 400 may include providing an inside shaft designed to rotate an internal latching mechanism of the door lock. The inside shaft may have a follower and a through cavity. The follower can be designed to cause the inside shaft to rotate.

In block 406, method 400 may include providing an outside shaft designed to be rotated by an outside handle. The outside shaft may include a cylindrical part disposed inside the through cavity of the inside shaft, a polyhedral part designed to be engaged with the outside handle, and a gear seat located at end of the cylindrical part and outside of the inside shaft.

In block 408, method 400 may include providing a first gear. The first gear can be permanently engaged in rotation with the inside handle thereby being permanently engaged in rotation with the driver. The first gear can slide along an internal cavity of the tube toward the gear seat.

In block 410, method 400 may include providing a second gear designed to move along the gear seat and be engageable with the first gear.

In block 412, method 400 may include providing an engagement mechanism designed to cause the first gear and the second gear to be engaged or disengaged by moving the first gear along an internal cavity of the tube or moving the second gear along the gear seat. The engagement mechanism, the second gear, the driver, and the follower can be located on the unsecured side of a door (the side the door protects) or inside the door in which the door lock is integrated. The engagement mechanism may include an electrical magnet. The electrical magnet may cause the second gear to move toward the first gear. Alternatively, the electrical magnet may cause the first gear to move toward the second gear. In some embodiments, the electrical magnet may cause both the first gear and the second gear to move toward each other. In certain embodiments, the engagement mechanism may include an electro-mechanical motor. The electro-mechanical motor can move the second gear toward the first gear. Alternatively, the electro-mechanical motor can move the first gear toward the second gear. In some embodiments, the electro-mechanical motor can move both the first gear and the second gear toward each other. The engagement mechanism may include a spring causing the first gear and the second gear to move away from each other.

When the first gear and the second gear are engaged and the outside shaft is rotated, the second gear causes the driver to engage the follower of the inside shaft, thereby causing the inside shaft to rotate the internal latching mechanism of the door lock. When the second gear is disengaged from the first gear, the driver stops to respond to rotation of the outside shaft.

In optional block 414, method 400 may include providing a rod. The outside shaft may have a further through cavity and the rod can be disposed within the further through cavity. The rod can be designed to push the second gear toward the first gear when a door key is inserted into a lock-and-key mechanism integrated into the outside handle.

In optional block 416, method 400 may include providing a spring designed to move the rod outward from the second gear when the door key is removed from the lock-and-key mechanism.

Figure 5:
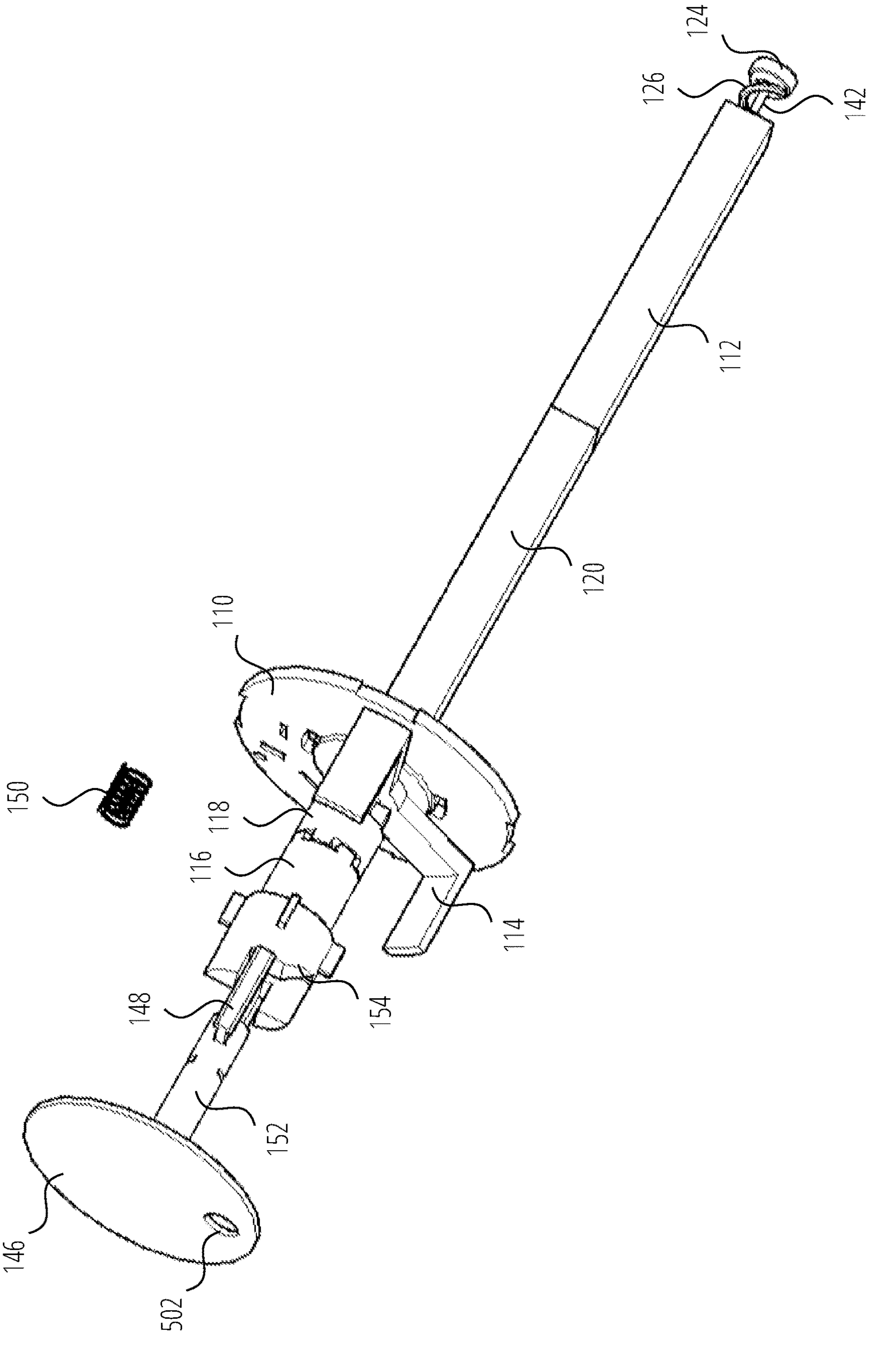
FIG. 5 is schematic diagram showing a control dial and a first gear engaged with a second gear, according to an example embodiment.

FIG. 5 is a schematic diagram showing a control dial 146 and a first gear 116 engaged with a second gear 118, according to an example embodiment. The control dial 146 may include an opening 502. A user may use the opening 502 to rotate the control dial 146. Specifically, the user may place a finger or a pin (not shown) inside the opening 502 and move the finger or the pin to rotate the control dial 146. When the user rotates the control dial 146 in a first direction, the first gear 116 moves towards the second gear 118 and engages the second gear 118. Specifically, the rotation of the control dial 146 moves the first gear 116 against the second gear 118, thereby collapsing the spring 150 between the first gear 116 and the second gear 118. The sloped back side 154 of the first gear 116 allows the movement of the first gear 116 when the control dial 146 is rotated.

Figure 6:
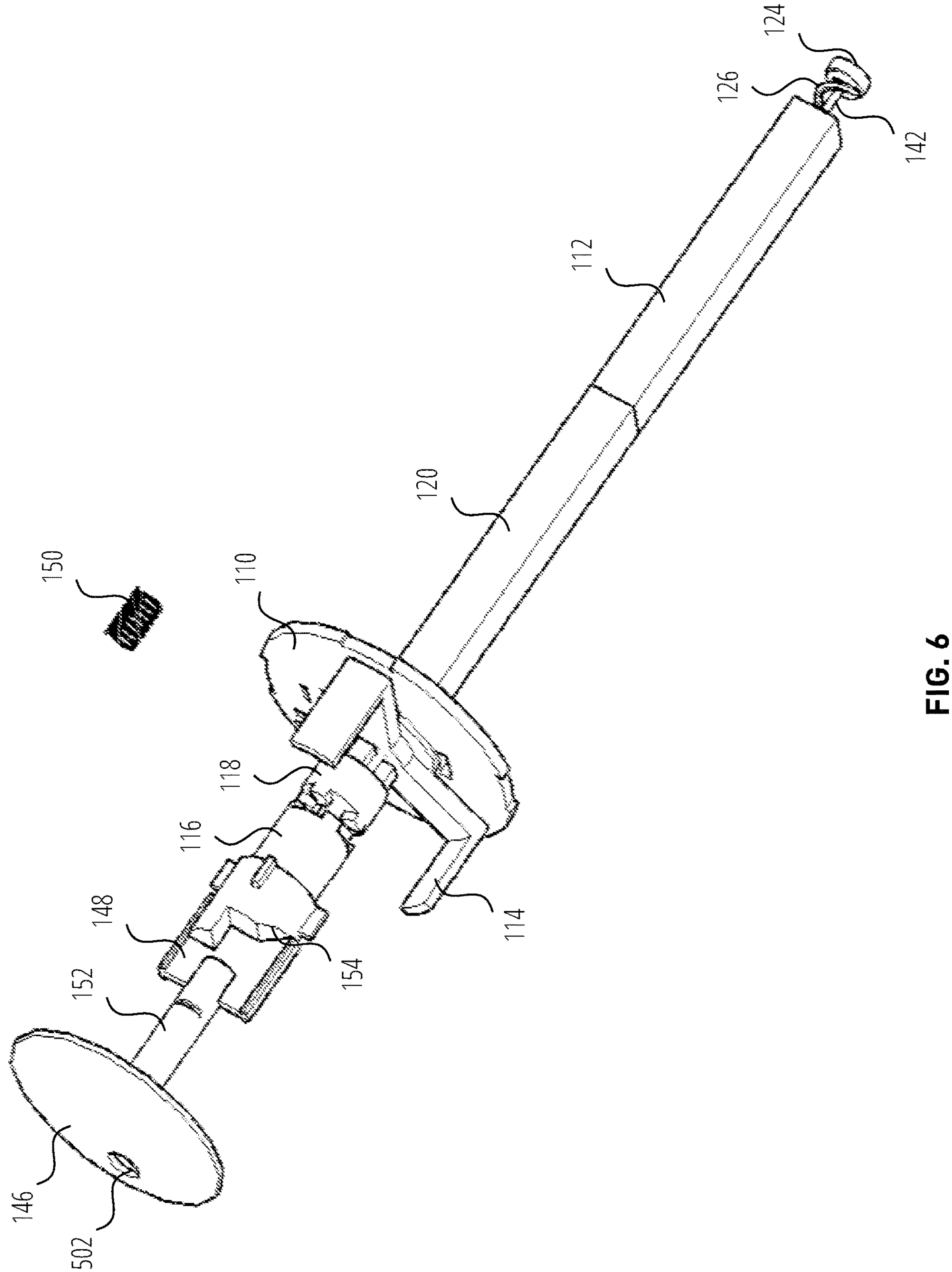
FIG. 6 is schematic diagram showing a control dial and a first gear disengaged from a second gear, according to an example embodiment.

FIG. 6 is a schematic diagram showing the control dial 146 and the first gear 116 disengaged from the second gear 118, according to an example embodiment. The first gear 116 and the second gear 118 remain engaged until the control dial 146 is turned in a second direction opposite to the first direction. When the user rotates the control dial 146 with a finger or the pin in the second direction, the first gear 116 moves away from the second gear 118, thereby disengaging the second gear 118. The rotation of the control dial 146 in the second direction enables the spring 150 to push the first gear 116 and the second gear 118 away from each other.

Thus, an opening device for a door lock is described. Although embodiments have been described with reference to specific exemplary embodiments, it will be evident that various modifications and changes can be made to these exemplary embodiments without departing from the broader spirit and scope of the present application. Accordingly, the specification and drawings are to be regarded in an illustrative rather than a restrictive sense.

What is claimed is:

1. An opening device for a door lock, the opening device comprising:
- a driver rigidly connected to an inside handle;
- an inside shaft designed to rotate an internal latching mechanism of the door lock, the inside shaft having a follower and a through cavity;
- an outside shaft designed to be rotated by an outside handle, the outside shaft including:
  - a cylindrical part disposed inside the through cavity of the inside shaft;
  - a polyhedral part designed to be engaged with the outside handle; and
  - a gear seat located at end of the cylindrical part and outside of the inside shaft;
- a first gear being permanently engaged in rotation with the inside handle, thereby being permanently engaged rotationally with the driver and configured to be able to slide toward the gear seat;
- a second gear designed to move along the gear seat and be engageable with the first gear;
- an engagement mechanism designed to cause the first gear and the second gear to be engaged or disengaged by moving at least one of the first gear or the second gear, wherein when the first gear and the second gear are engaged and the outside shaft is rotated, the second gear causes the driver to engage the follower of the inside shaft, thereby causing the inside shaft to rotate the internal latching mechanism of the door lock; and
- a rod, wherein:
  - the outside shaft has a further through cavity; and
  - the rod is disposed within the further through cavity and designed to push the second gear toward the first gear when a door key is inserted into a lock-and-key mechanism integrated into the outside handle.

2. The opening device of claim 1, wherein:
- the door lock is integrated in a door; and
- the engagement mechanism, the second gear, the driver, and the follower are located inside a space the door protects access to.

3. The opening device of claim 1, wherein when the second gear is disengaged from the first gear, the driver stops to respond to rotation of the outside shaft.

4. The opening device of claim 1, wherein the driver is capable of engaging the follower in response to a rotation of the inside handle independently of whether the second gear is engaged with the first gear.

5. The opening device of claim 1, further comprising a disk and a tube, the disk being rigidly connected to the driver, the tube being rigidly connected to the inside handle.

6. The opening device of claim 1, wherein the engagement mechanism includes an electrical magnet causing the second gear to move toward the first gear.

7. The opening device of claim 1, wherein the engagement mechanism includes an electrical magnet causing the first gear to move toward the second gear.

8. The opening device of claim 1, wherein the engagement mechanism includes a spring causing the first gear and the second gear to move away from each other.

9. The opening device of claim 1, further comprising a spring designed to move the rod outward from the second gear when the door key is removed from the lock-and-key mechanism.

10. The opening device of claim 1, further comprising a push button mounted on a surface of the inside handle, wherein:
- pressing the push button causes the first gear to move toward the second gear and engage with the second gear, thereby allowing the inside shaft to be rotated by the outside handle to unlock the door lock; and
- releasing the push button causes the first gear to move away from the second gear and disengage with the second gear, thereby disallowing the inside shaft to be rotated by the outside handle and preventing unlocking the door lock via the outside handle.

11. The opening device of claim 1, further comprising:
- a dial mounted on a surface of the inside handle;
- a blade located inside an internal cavity of the inside handle;
- a further rod connecting the dial and the blade; and
- the first gear includes a sloped back side engageable with the blade; wherein when the blade is rotated by the dial via the further rod in a first direction:
  - the rotation of the blade causes, via the sloped back side, the first gear to move toward the second gear and engage with the second gear, thereby allowing the inside shaft to be rotated by the outside handle to unlock the door lock; and
  - the first gear and the second gear are engaged until the blade is rotated by the dial via the further rod in a second direction, the second direction being opposite to the first direction.

12. A method for manufacturing an opening device for a door lock, the method comprising:

providing a driver rigidly connected to an inside handle;

providing an inside shaft designed to rotate an internal latching mechanism of the door lock, the inside shaft having a follower and a through cavity;

providing an outside shaft designed to be rotated by an outside handle, the outside shaft including:

a cylindrical part disposed inside the through cavity of the inside shaft;

a polyhedral part designed to be engaged with the outside handle; and a gear seat located at end of the cylindrical part and outside of the inside shaft;

providing a first gear being permanently engaged in rotation with the inside handle, thereby being permanently engaged rotationally with the driver and configured to be able to slide toward the gear seat;

providing a second gear designed to move along the gear seat and be engageable with the first gear;

providing an engagement mechanism designed to cause the first gear and the second gear to be engaged or disengaged by moving at least one of the first gear or the second gear, wherein when the first gear and the second gear are engaged and the outside shaft is rotated, the second gear causes the driver to engage the follower of the inside shaft, thereby causing the inside shaft to rotate the internal latching mechanism of the door lock; and providing a rod, wherein:

the outside shaft has a further through cavity; and the rod is disposed within the further through cavity and designed to push the second gear toward the first gear when a door key is inserted into a lock-and-key mechanism integrated into the outside handle.

13. The method of claim 12, wherein:

the door lock is integrated in a door; and the engagement mechanism, the second gear, the driver, and the follower are located inside a space the door protects access to.

14. The method of claim 12, wherein when the second gear is disengaged from the first gear, the driver stops to respond to rotation of the outside shaft.

15. The method of claim 12, wherein the driver is capable of engaging the follower in response to a rotation of the inside handle independently of whether the second gear is engaged with the first gear.

16. The method of claim 12, further comprising providing a disk and a tube, the disk being rigidly connected to the driver, the tube being rigidly connected to the inside handle.

17. The method of claim 12, wherein the engagement mechanism includes an electrical magnet causing the second gear to move toward the first gear.

18. The method of claim 12, wherein the engagement mechanism includes an electrical magnet designed to move the first gear toward the second gear.

19. The method of claim 12, wherein the engagement mechanism includes a spring causing the first gear and the second gear to move away from each other.

20. The method of claim 12, further comprising providing a push button mounted on a surface of the inside handle, wherein:

pressing the push button causes the first gear to move toward the second gear and engage with the second gear, thereby allowing the inside shaft to be rotated by the outside handle to unlock the door lock; and releasing the push button causes the first gear to move away from the second gear and disengage with the second gear, thereby disallowing the inside shaft to be rotated by the outside handle and preventing unlocking the door lock via the outside handle.

21. The method of claim 12, further comprising:

providing a dial mounted on a surface of the inside handle;

providing a blade located inside an internal cavity of the inside handle; and connecting the dial and the blade with a further rod; and wherein:

the first gear includes a sloped back side engageable with the blade; wherein when the blade is rotated by the dial via the further rod in a first direction:

the rotation of the blade causes, via the sloped back side, the first gear to move toward the second gear and engage with the second gear, thereby allowing the inside shaft to be rotated by the outside handle to unlock the door lock; and the first gear and the second gear are engaged until the blade is rotated by the dial via the further rod in a second direction, the second direction being opposite to the first direction.

* * * * *